(12) United States Patent
Wilks et al.

(10) Patent No.: US 9,462,168 B2
(45) Date of Patent: Oct. 4, 2016

(54) LIGHT PROPAGATION TIME CAMERA SYSTEM HAVING SIGNAL PATH MONITORING

(75) Inventors: Ralph Wilks, Meckenbeuren (DE); Bernd Damhofer, Wolfegg (DE)

(73) Assignee: IFM ELECTRONIC GMBH, Essen (DE)

( * ) Notice: Subject to any disclaimer, the term of this patent is extended or adjusted under 35 U.S.C. 154(b) by 655 days.

(21) Appl. No.: 13/811,948

(22) PCT Filed: Jul. 28, 2011

(86) PCT No.: PCT/EP2011/063056
§ 371 (c)(1),
(2), (4) Date: Jan. 24, 2013

(87) PCT Pub. No.: WO2012/013760
PCT Pub. Date: Feb. 2, 2012

(65) Prior Publication Data
US 2013/0120565 A1    May 16, 2013

(30) Foreign Application Priority Data

Jul. 28, 2010 (DE) .......... 10 2010 038 591
Sep. 24, 2010 (DE) .......... 10 2010 041 390

(51) Int. Cl.
*G01C 3/08* (2006.01)
*H04N 5/225* (2006.01)
(Continued)

(52) U.S. Cl.
CPC ............. *H04N 5/2256* (2013.01); *G01S 7/497* (2013.01); *G01S 7/4911* (2013.01); *G01S 17/10* (2013.01); *G01S 17/36* (2013.01); *G01S 17/89* (2013.01); *G01S 2007/4975* (2013.01)

(58) Field of Classification Search
CPC ........ G01S 7/10; G01S 7/4911; G01S 7/497; G01S 17/10; G01S 17/36; G01S 17/89; G01S 2007/4975; H04N 5/2256
See application file for complete search history.

(56) References Cited

U.S. PATENT DOCUMENTS

| 4,600,299 A | 7/1986 | Abshire |
| 6,463,393 B1 | 10/2002 | Giger |

(Continued)

FOREIGN PATENT DOCUMENTS

| DE | 19704496 A1 | 3/1998 |
| DE | 10014125 A1 | 9/2001 |

(Continued)

OTHER PUBLICATIONS

European Patent Office, International Search Report in International Patent Application No. PCT/EP2011/063056 (Dec. 7, 2011).

*Primary Examiner* — Luke Ratcliffe
*Assistant Examiner* — Samantha K Abraham
(74) *Attorney, Agent, or Firm* — Leydig, Voit & Mayer, Ltd.

(57) ABSTRACT

A time-of-flight camera system includes a photosensor having at least one receiving pixel and a source of illumination. A modulator is configured to provide a modulation signal to the photosensor and to the source of illumination. A control sensor is connected to at least one reference light source or an electric mixer. The control sensor is disposed in a vicinity of the source of illumination such that the control sensor receives at least a portion of the radiation emitted by the source of illumination. The control sensor is configured to provide an electric output signal that substantially matches an intensity-over-time curve of the received radiation.

14 Claims, 4 Drawing Sheets

(51) Int. Cl.
*G01S 7/497* (2006.01)
*G01S 17/10* (2006.01)
*G01S 17/36* (2006.01)
*G01S 17/89* (2006.01)
*G01S 7/491* (2006.01)

(56) References Cited

U.S. PATENT DOCUMENTS

2001/0048519 A1 12/2001 Bamji et al.
2004/0085526 A1 5/2004 Gogolla et al.
2006/0193633 A1* 8/2006 Minato et al. .................. 398/77

FOREIGN PATENT DOCUMENTS

| DE | 10022054 A1 | 11/2001 |
| DE | 10104418 A1 | 8/2002 |
| DE | 10228677 A1 | 1/2004 |
| DE | 202005012479 U1 | 10/2005 |
| DE | 102004037137 A1 | 3/2006 |
| DE | 102008005337 A1 * | 7/2009 |
| EP | 1777747 A1 | 4/2007 |
| EP | 2199999 A1 | 6/2010 |

* cited by examiner

LIGHT PROPAGATION TIME CAMERA SYSTEM HAVING SIGNAL PATH MONITORING

CROSS-REFERENCE TO PRIOR APPLICATIONS

This application is a U.S. National Phase application under 35 U.S.C. §371 of International Application No. PCT/EP2011/063056, filed on Jul. 28, 2011, and claims benefit to German Patent Application Nos. DE 10 2010 038 591.3, filed Jul. 28, 2010 and DE 10 2010 041 390.9, filed on Sep. 24, 2010. The International Application was published in German on Feb. 2, 2012 as WO 2012/013760 under PCT Article 21(2).

FIELD

The invention relates to a time-of-flight camera system and to a method for operating such a system.

BACKGROUND

The term "time-of-flight camera system" should encompass not only systems that measure distances directly from the time of flight but also and especially all time-of-flight camera systems or 3D-TOF camera systems that extract time-of-flight information from the phase shift of emitted and received radiation. Particularly well-suited as time-of-flight cameras or 3D-TOF cameras are PMD cameras with photonic mixer devices (PMD) of the type described, among others, in European patent application EP 1 777 747, U.S. Pat. No. 6,587,186 and German patent application DE 197 04 496, and commercially available, for example, from the company IFM ELECTRONIC GMBH under the name FRAME GRABBER O3D. In particular, a PMD camera allows a flexible arrangement of the light source and of the detector, which can be arranged in a housing as well as separately. It goes without saying that the terms "camera" or "camera system" also include cameras or devices that have at least one receiving pixel such as, for instance, the O1D distance sensor made by the applicant.

SUMMARY

In an embodiment, the present invention provides a time-of-flight camera system includes a photosensor having at least one receiving pixel and a source of illumination. A modulator is configured to provide a modulation signal to the photosensor and to the source of illumination. A control sensor is connected to at least one reference light source or an electric mixer. The control sensor is disposed in a vicinity of the source of illumination such that the control sensor receives at least a portion of the radiation emitted by the source of illumination. The control sensor is configured to provide an electric output signal that substantially matches an intensity-over-time curve of the received radiation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. In the drawings and following description, identical or comparable components are designated with the same reference numerals. The features and advantages of various embodiments of the present invention will become apparent by reading the following detailed description with reference to the attached drawings which illustrate the following.

DETAILED DESCRIPTION

Figure 1:
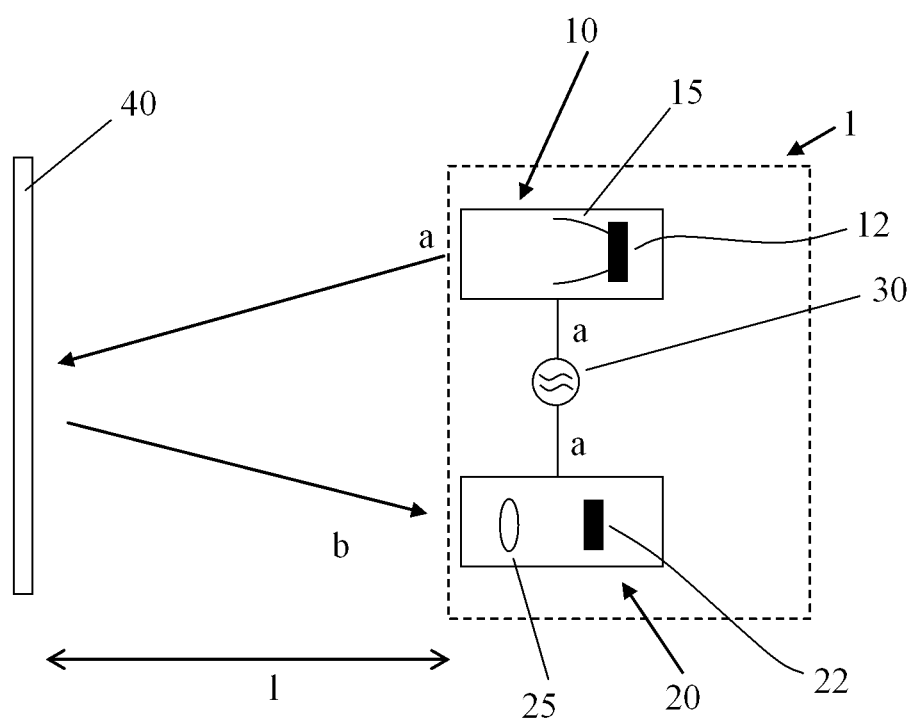
FIG. 1 shows the fundamental principle of a time-of-flight camera according to the PMD principle.

In an embodiment, the invention serves to monitor the entire signal path for safety-relevant applications such as, for instance, SIL (Safety Integrity Level, ASIL (Automotive Safety Integrity Level).

When it comes to safety-relevant applications, it should be ensured at all times that the camera recognizes if one of the components is not working according to the specifications.

In an embodiment, the invention refines the device in terms of its function monitoring or signal-path monitoring.

In an embodiment, the device is a time-of-flight camera system having a time-of-flight camera with a photosensor, a source of illumination and a modulator, whereby the modulator serves to impinge a modulation or modulation frequency onto the photosensor and onto the source of illumination. The photosensor has at least one receiving pixel and is preferably configured as a photomixer detector. In an advantageous manner, a control sensor is arranged in the vicinity of the source of illumination in such a way that at least some of the radiation emitted by the source of illumination can reach the control sensor either directly or indirectly.

As a function of the detected radiation, the control sensor preferably provides an electric output signal that matches the intensity-over-time curve of the radiation received from the source of illumination or that characterizes the radiation-over-time curve, whereby the control sensor is associated with at least one reference light source or with an electric mixer.

This approach especially makes it possible to monitor the illumination module or the source of illumination via a separate and independent signal channel.

Equally advantageously, a method is provided in which the time-of-flight camera system can be operated during a distance-measuring interval and preferably during a control interval. During the distance-measuring interval, the source of illumination emits a modulated light in accordance with the impinged modulation. A distance value can be determined in a familiar manner on the basis of the time of flight, especially on the basis of the phase shift, of the light or of the useful light that reaches the photosensor.

In this process, a control sensor additionally serves to detect some of the light emitted by the source of illumination and, as a function of the detected light, an output signal is made available for the further processing, and at least one reference light source or an electric mixer is operated as a function of the output signal of the control sensor.

Since the output signal of the control sensor essentially matches the intensity-over-time curve of the source of illumination, such an approach means that the modulation behavior of the source of illumination, in turn, appears on the reference sensor and on the photosensor via the reference light source.

This approach advantageously makes it possible to check the functionality of the entire signal path, starting at the modulator and going all the way to the source of illumination and back to the photosensor. If, for instance, no plausible output signal can be detected, then it can be assumed that there is an interference in the signal path. If applicable, the evaluation unit can then initiate an appropriate error message and/or an error response.

Thus, in a simple manner, it can be achieved that the entire signal path can be monitored and every individual measurement can be made plausible. The failure of individual components as well as a corruption of the signals themselves can be detected.

Preferably, the control sensor is connected to the at least one reference light source or to the electric mixer via an electric transmission channel, whereby, in a particularly advantageous manner, the transmission channel is configured for digital transmission of the output signal of the control sensor.

It is particularly useful to arrange at least one reference light source in the vicinity of the photosensor, namely, in such a way that radiation emitted by the reference light source illuminates a reference photosensor and/or the photosensor.

Such an arrangement makes it possible to illuminate the reference photosensor and/or the photosensor with a suitable test light for testing or calibration purposes. For instance, the sensor can be illuminated with a constant or modulated light or test light, whereby the functionality of the sensor or of the signal path can be evaluated as a function of the signals generated by the sensors.

In an especially preferred embodiment, a first reference light source is provided for illuminating the reference photosensor while a second reference light source is provided for illuminating the photosensor.

The illumination of the reference photosensor with the first reference light source allows the functionality of the source of illumination to be checked, among other things, in the case of illumination as a function of the output signal of the control sensor. If no signal is present at the reference photosensor, it can be assumed that this signal path is defective and that it is highly probable that the source of illumination has failed.

The illumination of the photosensor with the second reference light source allows, for example, the functionality of the photosensor to be checked during pauses in the measurement. In particular, it can also be provided that a control measurement is carried out before or after a distance measurement has been completed.

Impinging the output signals onto the electric mixer—as was the case with the illumination by means of illumination of the reference photosensor with the first reference light source—allows the functionality of the illumination or of the associated signal path to be checked.

These advantages can also be correspondingly gleaned from the further methods according to embodiments of the invention.

Preferably, a method for a time-of-flight camera system having an electric mixer is provided wherein the signals of the electric mixer are evaluated to check for the error-free functioning of the signal path, and/or wherein compensation measures pertaining to the distance measurement are initiated. This approach makes it possible to advantageously check the signal path and even the distance measurement on an ongoing basis.

Preferably, it is provided that at least one reference light source is operated as a function of the light or of its output signal detected by the control sensor.

An equally advantageous method for a time-of-flight camera system having at least one reference light source is being put forward wherein, during a control interval or a control measurement, the at least one reference light source illuminates the photosensor and the signals of the photosensor are evaluated to check for the error-free functioning of the signal path and/or of the photosensor, and/or compensation measures pertaining to the distance measurement are initiated.

Moreover, it is advantageously provided that, during a distance-measuring interval, the reference photosensor is illuminated by means of the first reference light source and, on the basis of the signals of the reference photosensor, a malfunction of the time-of-flight camera or of the time-of-flight camera system is detected, and/or compensation measures pertaining to the distance measurement are initiated.

Preferably, it is also provided that the photosensor is illuminated by means of the second reference light source before or after one or more distance measurements or phase measurements during a control interval.

Furthermore, it is advantageous for a testing operation to be provided in which at least one reference light source is impinged with test signals.

FIG. 1 shows a measuring situation for an optical distance measurement with a time-of-flight camera of the type disclosed, for example, in German specification DE 197 04 496.

The time-of-flight camera system 1 comprises an emitting unit or an illumination module 10, 100 having a source of illumination 12 and an associated beam-forming optical system 15 as well as a receiving unit or TOF camera 20 having a receiving optical system 25 and a photosensor 22. The photosensor 22 has at least one pixel, preferably, however, a pixel array, and it is especially configured as a PMD sensor. With an eye towards improving the imaging properties, the receiving optical system 25 typically consists of several optical elements. The beam-forming optical system 15 of the emitting unit 10 is preferably configured as a reflector. However, diffractive elements or combinations of reflective and diffractive elements can also be employed.

The measuring principle of this arrangement is essentially based on the fact that the time of fight of the emitted and reflected light can be determined on the basis of the phase shift of the emitted and received light. For this purpose, a modulator 30 impinges a certain modulation frequency having a first phase angle a onto the light source 12 as well as onto the photosensor 22. In accordance with the modulation frequency, the light source 12 emits an amplitude-modulated signal having the phase angle a. In the case presented here, this signal or the electromagnetic radiation is reflected off an object 40 and, owing to the distance it has traveled, it strikes the photosensor 22 correspondingly phase-shifted at a second phase angle b. In the photosensor 22, the signal of the first phase angle a of the modulator 30 is mixed with the received signal that has the time-of-flight-related second phase angle b, whereby the phase shift or the object distance l is determined on the basis of the resulting signal.

Figure 2:
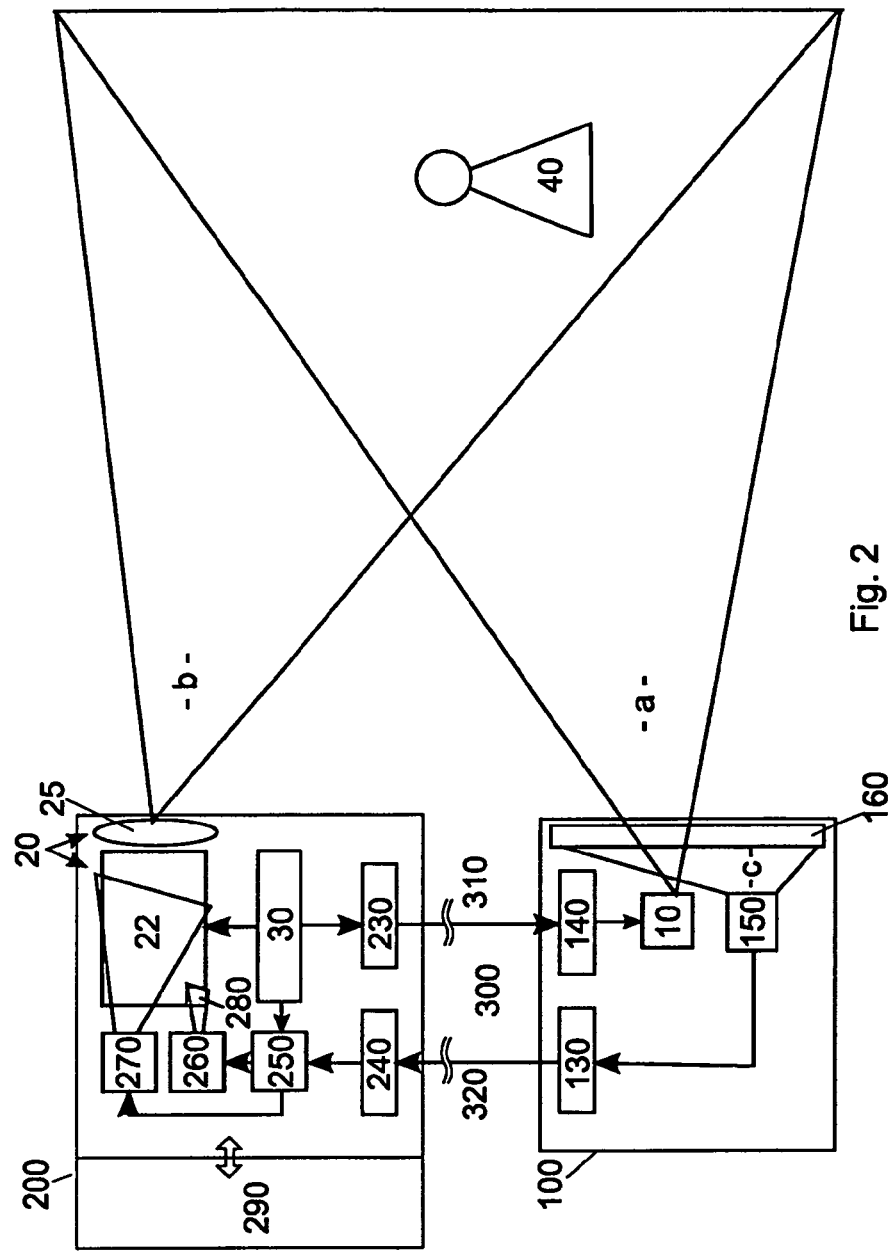
FIG. 2 shows a time-of-flight camera according to an embodiment of the invention.

FIG. 2 shows a time-of-flight camera system 1 according to an embodiment of the invention, in which the emitting and receiving units 10, 20 are arranged in a separate illumination module 100 and in a separate camera module 200. In its preferred embodiment, the modulator 30 or the signal transmitter generates a periodically modulated signal packet having a length of a few microseconds to a few milliseconds and preferably having a frequency within the megahertz range. The modulation signal is impinged onto the photosensor 22 as well as onto a signal driver 230. The camera module 200 and the illumination module 100 are connected to each other via a signal cable 300. The signals of the signal driver 230 are transmitted via the transmission channel A (forward channel) 310 to the signal receiver 140 of the illumination module 100. In a preferred embodiment, this is done by means of an electric LVDS signal (low-voltage differential signaling). However, other electric or optical signal-transmission modalities are likewise conceivable.

In the illumination module, the signal is received by the signal receiver 140 and conditioned for the illumination unit 10, which emits a corresponding light signal a. In the preferred embodiment, the light signal a passes through a virtually transparent front cover plate 160 and illuminates the measurement-relevant scene or objects 40. The objects 40 reflect some of the light signals back into the camera 200, where they are received by the photosensor 22. As already described, an object distance is determined for each pixel on the basis of the phase shift.

According to an embodiment of the invention, it is now provided that, in addition to the pixel-individual distance determinations, the functionality of the signal processing is also monitored. For this purpose, a control sensor 150 that receives a part c of the emitted light signal a is provided in the illumination module 100. In a preferred embodiment, the control sensor is a fast photodiode that receives its light signal, for example, through reflections off the light-permeable front cover plate 160. It is, for example, likewise conceivable for the light to be received in that the control sensor 150 has a direct line of sight to the illumination unit 10 or by using other suitable optical elements such as, for instance, mirrors or light guides.

The control sensor 150 preferably provides an analog output signal as the signal. This output signal is suitably conditioned by means of a signal driver 130 and transmitted to the receiving unit 240 of the camera module 200 by means of the signal cable 300 via the transmission channel B (reverse channel) 320. Here as well, the reverse channel can be transmitted, for instance, via an LVDS signal in the same signal cable 300. Other modes of transmission are also conceivable, and the channels A and B do not necessarily have to employ the same mode of transmission. Preferably, the signals are transmitted digitally via the signal cable. For instance, the signal driver 130 can be configured in such a way that the analog output signal of the control sensor 150 is digitalized prior to being transmitted. Of course, the digitalization can already take place in the control sensor 150 or in an interconnected analog-to-digital converter.

Depending on the application case, different pieces of information of the analog signal can be transmitted. For simple signal-path monitoring, it is usually sufficient to transmit just the rising signal edges and/or the falling signal edges of the light detected by the control sensor 150. For a detailed error analysis, however, it is also conceivable to transmit the information digitally via the amplitude as a bit value and/or optionally also as a sampled signal.

Depending on the application case, the control sensor 150 can also already be configured differently. In principle, the output signal should be able to image the characteristic edges of the light received from the illumination source. In such a case, the amplitude of the output signal can optionally even reach saturation. If an analysis of the amplitude is also desired, however, such an instance of saturation should be avoided.

The digital transmission of the signals is usually less error-prone than purely analog transmission. Nevertheless, for non-critical applications and/or for shorter signal-line lengths, it can also be quite practical to configure at least one channel A, B in analog form as well.

The signal that is preferably transmitted digitally via the reverse channel B is received by the signal receiver 240 and conditioned for the next first and second reference light sources 260, 270. The conditioning can be done, for example, in that an analog control signal for the reference light sources 260, 270 is generated from the transmitted digital signal.

The reference light sources 260, 270 serve to perform the reference measurement and/or to monitor the signal path. The monitoring is done in two ways. Both methods can be employed independently of each other. Preference, however, is given to a combination of both methods. The reference light sources 260, 270 are selected by means of a signal converter 250.

The reference measurement is preferably conducted during the main measurement, that is to say, during the distance measurement. Here, a reference photosensor 280 consisting of a reference pixel or a reference pixel structure is illuminated by the first reference light source 260. Preferably, it is provided that the reference photosensor 280 is not illuminated by a light that penetrates through the receiving optical system 25.

This approach allows several options for function monitoring. According to an embodiment of the invention, it is provided that the first reference light source 260 is modulated as a function of the light received by the control sensor 150. If the control sensor 150 does not receive a light signal, then the first reference light source 260 will not emit any light either. Since no signal is received by the reference photosensor 280 in this case either, for example, a malfunction of the camera system can be indicated or an appropriate error response can be activated.

If the illumination unit 10 or the emitting signal chain or the signal path is functioning, the control sensor 150 receives a correspondingly modulated light and transmits it in the same modulation frequency to the converter 250 or to the first reference light source 260, respectively. Deviations of the light signal such as, for instance, a temperature-related shift of the phase or of the emission times of the light pulses or even ageing of the light source or of the photosensor or the like can all be determined and compensated for on the basis of this reference light signal.

In another embodiment according to the invention, it is provided that an additional control measurement is carried out after the distance measurement. In this control measurement or signal-path monitoring, the second reference light source 270 illuminates the entire photosensor 22 and, if applicable, also the reference photosensor 280. This control measurement serves to monitor the photosensor 22 itself, including the reading-out and evaluation procedures. Preferably, the photosensor is not illuminated uniformly, but rather in an irregular manner so that essentially different information, for example, a different brightness value, is measured for each pixel. Such an approach makes it possible to additionally monitor whether all of the pixels have been read out correctly. In the case of deviations that fall outside of a permissible tolerance range or else above or below a permissible limit value, it can be provided, for example, that a malfunction of the camera system is indicated or that an appropriate error response is activated.

The sequence of a reference measurement and/or a control measurement is preferably stored in a program of the evaluation unit 290 or in the camera. Moreover, the measurements can be configured in such a way that they can be used, for example, to adjust the camera or the camera system or the photosensor 22. The time needed for the control measurement can be selected so as to be considerably shorter than the time needed for the distance measurement since the light does not have to illuminate the environment, but rather, only a signal for the second reference light source 270 has to be generated. The amount of light generated by the reference light source 270 should preferably be larger than the amount of ambient light.

The reference photosensor 280 and/or the photosensor 22 do not necessarily have to be illuminated directly by the first and/or second reference light sources 260, 270, but rather, this can also be done indirectly, for instance, by reflections off a glass cover plate of the receiving optical system 25 or other surfaces or components inside the camera.

The wavelengths of the reference light sources 260, 270 can also be different from each other and/or can differ from the wavelength of the source of illumination 12. Thus, in an advantageous embodiment, it would be possible, for example, by employing suitable optical elements such as, for instance, interference filters, for the second reference light source 270 to illuminate the photosensor 22 as well as the reference photosensor 280, but for the first reference light source 260 to only illuminate the reference photosensor 280. As an alternative, shielding the reference photosensor 280 from an external incident light signal b would also be advantageously possible as an alternative, for example, to optical diaphragms.

In another embodiment, it would be conceivable to provide a purely electric mixer instead of the first reference light source 260 and the reference photosensor 280. In other words, the modulated light optically detected by the control sensor 150 is not emitted again via a light source and then received via a pixel, but rather, it can be applied as an electric signal directly to a mixer, so as to generate a signal in this manner. This procedure has the advantage that an additional light path can be dispensed with.

Moreover, it can also be provided that the output signal of the control sensor is made available, either directly or via a transmission path, to the evaluation unit 290, where the signal can then be evaluated directly and/or made available to other analysis units or modules.

Figure 3:
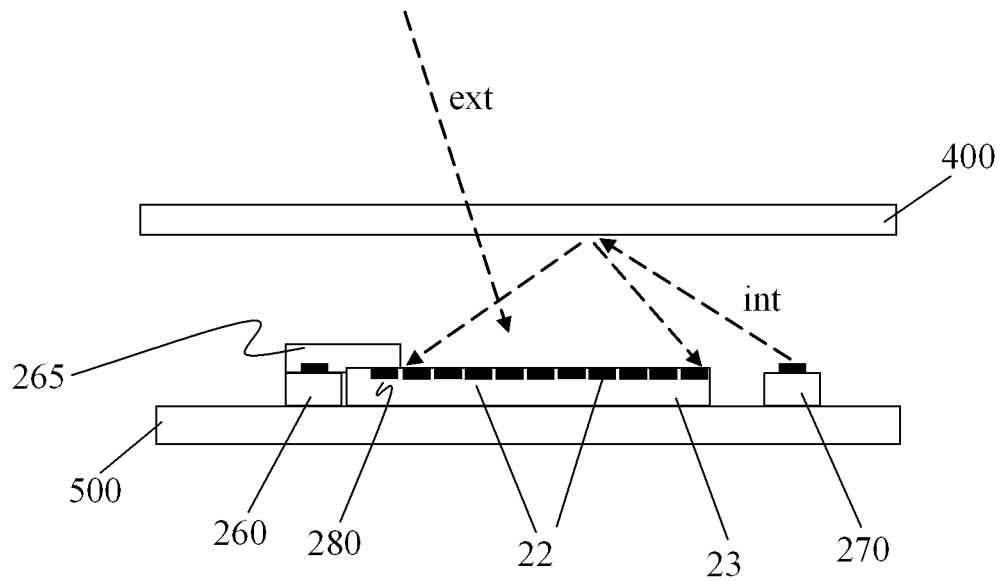
FIG. 3 shows a possible arrangement of the components of a system according to an embodiment of the invention.

By way of an example, FIG. 3 shows a possible arrangement of relevant components according to an embodiment of the invention. The first reference light source 260, a photosensor component 23 and the second reference light source 270 are arranged consecutively on a component support 500. In the example shown, the photosensor component 23 supports the photosensor 22 for the distance measurement as well as the reference photosensor 280.

In the example shown, the reference photosensor 280 is characterized in that at least the light-sensitive area of the reference photosensor 280 is connected to the light-emitting surface of the first reference light source 260 via a light-guide channel 265. The light-guide channel 265 is preferably configured in such a way that no appreciable radiation can reach the outside. Owing to this approach, the first reference light source 260 and the reference photosensor 280 are optically connected to each other.

In the present example, a transparent glass cover plate 400 is arranged on the side opposite from the components 22, 23, 270. The external radiation (ext) or the useful light for the time-of-flight measurement can penetrate the glass cover plate 400 essentially unhindered. During operation, the reference light source 270 emits light in the direction of the glass cover plate 400. Some of the internal light (int) will penetrate through the glass cover plate 400 and reach the outside, while some of it will be reflected off the glass cover plate 400 and reach the photosensitive layer of the photosensor 22, where it can then be detected.

The glass cover plate 400 shown constitutes just one example of how to project the light of the reference light source 270 onto the photosensor 22. Basically, instead of or in addition to the glass cover plate 400, it is also possible to use a reflecting surface that allows at least an indirect illumination of the photosensor 22. It is likewise conceivable for the inner surfaces of the camera housing themselves to suffice as reflection surfaces.

Of course, it is also conceivable to arrange the reference light source in the housing in such a way that the photosensor 22 can be illuminated directly by the reference light source 270.

Irrespective of the specific arrangement, however, during the control measurement or signal-path monitoring, it should be ensured that the external incident light (ext) is negligible in comparison to the internal light (int).

In a preferred implementation form, a simple pixel or else a pixel array of the photosensor 22 that is present is employed as the reference photosensor 280 for the reference measurements. This approach has the advantage that the electric and physical behavior of the reference thus selected virtually identically reflects the behavior of the other "measuring" photosensor 22.

In another advantageous embodiment, it is also conceivable for the reference photosensor 260 to be structured autonomously on the photosensor component 23 or else as a separate component.

As described above, the phase mixing can also take place purely electrically, so that it is then optionally possible to dispense with a reference photosensor 280 along with the optical coupling.

Figure 4:
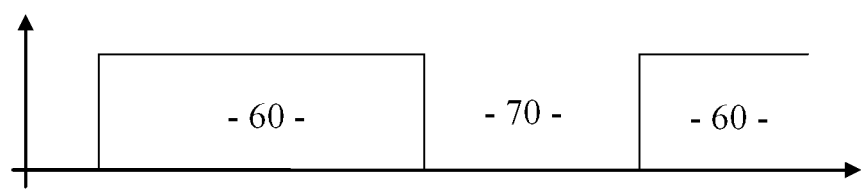
FIG. 4 shows, by way of an example, a possible sequence of signal-path monitoring.
Figure 4:
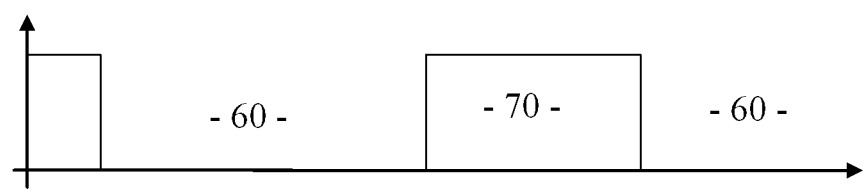

FIG. 4 shows the course-over-time of a distance measurement 60 and a control measurement 70. During the time interval of the distance measurement, one or more distance measurements, for example, can be carried out; and if applicable, a distance measurement can also be initially restricted to just a single phase measurement. After a distance measurement interval 60 has been completed, there is a pause during which the control measurement 70 according to an embodiment of the invention can be carried out. Owing to the typically low light intensity of the received useful signal, relatively long integration times of the photosensor 22 are needed during the distance measurement interval 60. Since the internal light of the second reference light source 270 is preferably applied at a high intensity onto the photosensor 22, as a rule, shorter integration times can normally be employed for the control measurement. Moreover, if applicable, the number of control measurements can be reduced to one measurement, so that, all in all, the control interval 70 can be kept considerably shorter than the distance measuring interval 60.

Figure 5:
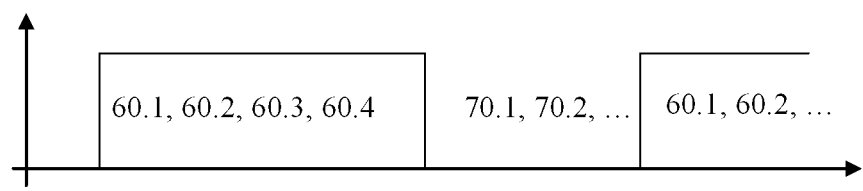
FIG. 5 shows another example of signal-path monitoring.

FIG. 5 shows another embodiment in which several measurements are provided for during the distance measuring interval 60, whereby the illumination takes place at various phase angles or phase shifts 60.1, 60.2, 60.3, 60.4, for example, by 0°, 90°, 180° and 270°. A reliable distance value, for instance, can be obtained on the basis of these measurements.

The phase angle of the illumination is typically shifted relative to the modulation phase of the photosensor 22. Fundamentally, however, the modulation phase of the photosensor 22 can also be shifted with respect to the phase angle of the illumination.

According to an embodiment of the invention, it is provided that measurements at different phase shifts 70.1, 70.2, etc. are also performed during the control measurement 70.

Preferably, a modulator 30 initiates the switchover between the distance measurement 60 and the control measurement 70. Typically, functions that control the switchover and/or the phase shifts are also stored in the modulator 30. Depending on the function that is planned or carried out in the modulator 30, for instance, the converter 250 can be actuated or else the illumination source 12 can be operated with an optionally phase-shifted signal.

As an alternative, these functions, at least partially, can also be stored in the evaluation unit 290, or else the converter 250 is already part of the evaluation unit 290.

Figure 6:
FIG. 6 shows another example of signal-path monitoring.

As shown in FIG. 6, the control measurement 70 can optionally be carried out immediately before or after a phase measurement 60.1, 60.2, etc.

It is likewise conceivable that, as an alternative to or in addition to the actual signal-path monitoring or control measurement, the modulator 30 conveys a modulation signal directly to one of the reference light sources 260, 270. This approach has the advantage that, for example, if a signal path is recognized as being defective, another error analysis can be conducted in that the photosensor 22 or the reference photosensor 280 can be illuminated with modulated light without switching on the illumination source 12. If, in such a case, the sensor 22, 280 is operating error-free, it can be assumed that the illumination 10 or the signal path is defective.

Furthermore, it can provided that the evaluation unit 290 or the modulator 30 makes special test signals available for a testing operation. This testing operation could be integrated into a control and/or reference measurement or else could be carried out during a testing interval of its own.

For example, a sequence of phase shifts that should ultimately result in a certain measured sequence of times of flight or distance values could be made available in such an additional control measurement or testing measurement. If the results diverge from what is expected, different responses can be triggered as a function of the magnitude of the deviations. For instance, if a deviation still falls within the tolerance range, the photosensor 22 or the evaluation algorithm could be calibrated. If the deviation falls outside of the permissible tolerance range, it is conceivable, for example, that an error will be indicated.

Other test signals with special properties in terms of amplitude and frequency, especially also a constant amplitude, are likewise conceivable.

For example, the time-of-flight or distance values can be evaluated on the basis of the results obtained during the control and/or reference measurement. For instance, as a function of results of the parallel reference measurements, the measured values of the distance measurement can be rendered plausible, corrected and/or weighted or, if applicable, discarded. It goes without saying that, for this purpose, it is also possible to utilize one or more of the control measurements carried out before or after the distance measurement.

In another embodiment, it can also be provided that the radiation output of the source of illumination 12 is reduced during the control measurement so that the energy consumption of the system can be advantageously reduced. The output can be easily reduced since no light reflecting off an external object is needed for monitoring the signal path, but rather, it is only necessary to ensure that the control sensor 150 obtains sufficient light from the illumination source 10, 12.

In the above-mentioned embodiments, the invention was elucidated primarily on the basis of a PMD time-of-flight camera. Of course, the invention is not restricted to this type of time-of-flight measurement.

Embodiments of the invention can also be easily applied to other variants of time-of-flight determinations or time-of-flight cameras that acquire distance-related data or three-dimensional information about the surroundings on the basis of times of flight.

Also in the case of a direct determination of a time of flight, as with a PMD camera as well, a source of illumination and a photosensor are provided to receive the useful light reflected off the object. By the same token, the control sensor according to an embodiment of the invention can be used to monitor the source of illumination, and the photosensor can be illuminated with the reference light sources according to an embodiment of the invention.

In this context, the term "modulated light" employed above is also meant to encompass "pulsed light" that is typical of a direct time-of-flight measurement. Hence, the described modulator should also be considered along the lines of a pulse generator or a pulse-width modulator.

Accordingly, the modulator can also be seen as a clock generator for the relevant components of such a time-of-flight measurement.

The embodiment according to FIG. 2 refers primarily to a time-of-flight camera 1 that is divided into two separate modules, namely, an illumination module 100 and a camera module 200. The use of a signal cable 300 and the use of signal drivers 130, 230 as well as signal receivers 140, 240 is primarily conducive for this application case.

When the illumination means 100 and the camera 200 are combined in one housing, this signal chain from the driver and receiver is not absolutely necessary, even though it can, in fact, be used. In a shared housing, it is preferably possible to dispense with this and, for example, the signals of the control sensor can be sent directly to the converter 250 or to the reference light source 260, 270.

In particular, variants of the configuration are conceivable. For instance, it can also be provided that the control sensor 150 in the vicinity of the source of illumination 10 takes over the function of the reference photosensor.

Then, it is likewise conceivable that the reference photosensor is not illuminated by the first reference light source 250 but rather, directly or indirectly by the illumination source 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE NUMERALS 10 emitting unit
100 illumination module
140 signal receiver
12 source of illumination
160 cover plate
150 control sensor
130 signal driver (e.g. modulation driver for LVDS)
124 emitted light
126 directly received light
200 camera module
20 receiving unit
22 photosensor
23 photosensor component
230 signal driver
240 signal receiver
250 signal converter
260 first reference light source
265 light channel
270 second reference light source
280 reference photosensor, reference pixel, reference pixel structure
290 evaluation unit
25 receiving optical system for useful light
30 modulator, modulation generator
300 signal cable
310 transmission channel A (forward channel)
320 transmission channel B (reverse channel)
40 object
400 glass cover plate, reflection surface
500 component support
60 distance measurement
70 control measurement

The invention claimed is:
1. A time-of-flight camera system comprising:
a photosensor having at least one receiving pixel;
a source of illumination;
a modulator configured to provide a modulation signal to the photosensor and to the source of illumination; and
a control sensor connected to at least one reference light source, which illuminates at least one of the photosensor and a reference photosensor, or to an electric mixer, the control sensor being disposed in a vicinity of the source of illumination such that the control sensor receives at least a portion of the radiation emitted by the source of illumination, the control sensor being configured to provide an electric output signal that substantially matches an intensity-over-time curve of the received radiation,
wherein the time-of-flight camera system is configured to operate the at least one reference light source or the electric mixer based on the electric output signal and to evaluate signals received from the photosensor, the reference photosensor or the electric mixer so as to detect a malfunction of the time-of-flight camera system or to initiate compensation measures pertaining to a distance measurement.

2. The dine-of-flight camera system according to claim 1, wherein the control sensor is connected to the at least one reference light source or to the electric mixer via an electric transmission channel.

3. The time-of-flight camera system according to claim 2, wherein the transmission channel is configured to provide a digital transmission of the output signal of the control sensor.

4. The time-of-flight camera system according to claim 1, wherein the control sensor is connected to the at least one reference light source such that the at least one reference light source is modulated as a function of the output signal of the control sensor, the at least one reference light source being disposed so as to emit radiation which illuminates at least one of the photosensor and a reference photosensor.

5. The time-of-flight camera system according to claim 4, wherein the at least one reference light source includes a first reference light source configured to illuminate the reference photosensor and a second reference light source configured to illuminate the photosensor.

6. The system according to claim 1, wherein the photosensor is configured as a photonic mixer device.

7. A method for operating a time-of-flight camera system, the method comprising:
emitting, by a source of illumination during a distance-measuring interval, a modulated light;
detecting, using at least one pixel of a photosensor, a distance signal for the at least one pixel based on a time of flight of the light;
detecting, by a control sensor, a portion of the light emitted by the source of illumination;
providing an output signal as a function of the light detected by the control sensor;
operating at least one reference light source, which illuminates at least one of the photosensor and a reference photosensor, or operating an electric mixer as a function of the light or the output signal; and
evaluating signals received from the photosensor, the reference photosensor or the electric mixer so as to detect a malfunction of the time-of-flight camera system or to initiate compensation measures pertaining to a distance measurement.

8. The method according to claim 7, wherein the detecting of the distance signal is performed based on a phase shift.

9. The method according to claim 7, wherein the operating is performed on the electric mixer, the method further comprising at least one of:
evaluating the signals, which are of the electric mixer, so as to check for an error-free functioning of a signal path; and
initiating the compensation measures pertaining to the distance measurement.

10. The method according to claim 7, wherein the operating is performed on the at least one reference light source, the method further comprising illuminating, using the at least one reference light source during a control interval or a control measurement, the photosensor, and at least one of:
evaluating the signals, which are of the photosensor, so as to check for an error-free functioning of at least one of a signal path and the photosensor; and
initiating the compensation measures pertaining to the distance measurement.

11. The method according to claim 7, wherein the operating is performed on the at least one reference light source which includes a first reference light source and a second reference light source, the method further comprising illuminating, using the first reference light source during the distance-measuring interval or a control measurement, a reference photosensor, and at least one of:

detecting the malfunction of the time-of-flight camera based on the signals, which are of the reference photosensor; and initiating the compensation measures pertaining to the distance measurement.

12. The method according to claim 11, further comprising illuminating, by the second reference light source during the control measurement, the photosensor before or after one or more distance measurements or phase measurements.

13. The method according to claim 7, wherein the operating is performed on the at least one reference light source which includes a first reference light source and a second reference light source, the method further comprising impinging the at least one reference light source with a test signal during a testing operation.

14. The method according to claim 7, wherein the photosensor is configured as a photonic mixer device.

\* \* \* \* \*